United States Patent
Conlon et al.

(10) Patent No.: US 9,005,076 B2
(45) Date of Patent: Apr. 14, 2015

(54) METHOD AND APPARATUS FOR CONTROLLING A SHIFT IN A MULTI-MODE POWERTRAIN SYSTEM

(71) Applicant: GM Global Technology Operations LLC, Detroit, MI (US)

(72) Inventors: Brendan M. Conlon, Rochester Hills, MI (US); Jy-Jen F. Sah, West Bloomfield, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 316 days.

(21) Appl. No.: 13/693,185

(22) Filed: Dec. 4, 2012

(65) Prior Publication Data

US 2014/0155221 A1    Jun. 5, 2014

(51) Int. Cl.
| | |
|---|---|
| *B60W 10/10* | (2012.01) |
| *B60K 6/365* | (2007.10) |
| *B60K 6/387* | (2007.10) |
| *B60K 6/445* | (2007.10) |
| *B60W 10/02* | (2006.01) |
| *B60W 10/08* | (2006.01) |
| *B60W 20/00* | (2006.01) |
| *B60K 6/38* | (2007.10) |

(52) U.S. Cl.
CPC .............. *B60K 6/365* (2013.01); *B60K 6/387* (2013.01); *B60K 6/445* (2013.01); *B60W 10/02* (2013.01); *B60W 10/08* (2013.01); *B60K 2006/381* (2013.01); *B60W 2710/083* (2013.01); *B60W 20/30* (2013.01); *B60W 20/20* (2013.01)

(58) Field of Classification Search
USPC ...................................................... 477/5, 8, 15
See application file for complete search history.

(56) References Cited

U.S. PATENT DOCUMENTS

| 8,000,865 | B2 | 8/2011 | Conlon et al. | |
|---|---|---|---|---|
| 2005/0182543 | A1* | 8/2005 | Sah et al. | 701/51 |
| 2008/0125265 | A1 | 5/2008 | Conlon et al. | |
| 2009/0281694 | A1* | 11/2009 | Conlon et al. | 701/51 |
| 2010/0305791 | A1* | 12/2010 | Sah et al. | 701/22 |
| 2011/0098152 | A1* | 4/2011 | Sah et al. | 477/86 |

* cited by examiner

*Primary Examiner* — Jacob S Scott

(57) ABSTRACT

A method for operating a powertrain system includes executing a transmission shift between an initial electrically-variable transmission (EVT) range and a target EVT range. The transmission shift includes transitioning to operating with three speed degrees of freedom including controlling speed of a second torque machine to synchronize speed of an oncoming clutch associated with the target EVT range and coincidentally controlling speeds of a first torque machine and an engine to achieve a preferred speed of the output member of the transmission. The transmission shift further includes controlling torque output from the first torque machine in response to an output torque request, and activating the oncoming clutch upon synchronizing the speed of the oncoming clutch. Subsequent to the transmission shift, the powertrain system is operated in the target EVT range.

12 Claims, 2 Drawing Sheets

METHOD AND APPARATUS FOR CONTROLLING A SHIFT IN A MULTI-MODE POWERTRAIN SYSTEM

TECHNICAL FIELD

This disclosure is related to dynamic system controls associated with multi-mode powertrain systems employing multiple torque-generative devices.

BACKGROUND

The statements in this section merely provide background information related to the present disclosure. Accordingly, such statements are not intended to constitute an admission of prior art.

Powertrain systems may be configured to transfer torque originating from multiple torque actuators through a torque transmission device to an output member that can be coupled to a driveline. Such powertrain systems include hybrid powertrain systems and extended-range electric vehicle systems. Control systems for operating such powertrain systems operate the torque actuators and apply torque transfer elements in the transmission to transfer torque in response to operator-commanded output torque requests, taking into account fuel economy, emissions, driveability, and other factors. Exemplary torque actuators include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating range and gear shifting, controlling the torque actuators, and regulating the electrical power interchange among the electrical energy storage device and the torque actuators to manage outputs of the transmission, including torque and rotational speed.

Known multi-mode electrically-variable transmissions (EVTs) can be configured to operate in one or more fixed-gear ranges, one or more electric vehicle (EV) ranges and one or more electrically-variable transmission (EVT) ranges. Known shifts between first and second EVT ranges occur at a synchronous speed point. Known shifts are executed by using one of the EVT ranges to slew engine speed to a desired transmission ratio to effect a shift including synchronous activation of an oncoming clutch. Transmission output torque may be well controlled during this type of shift, but the shift time can be long and require engine speed changes that can be noticeable to a vehicle operator. Furthermore, it may be desirable to shift between two EVT modes while maintaining a constant engine speed in order to provide a vehicle feel that is perceived as smooth by the operator. For example, during a transition from an EV drive mode to an engine-on operation at moderate to high vehicle speeds, the engine start occurs in a first, lower EVT range, e.g., an input-split range, with the transmission immediately transitioning to a second higher EVT range having a compound-split range to effect more efficient operation at higher vehicle speed. Required maximum torque from a first torque machine can be defined at a synchronous point for a transition from an input-split range to a compound-split range since the first torque machine must react torque from the engine and torque from a second torque machine in the compound-split arrangement.

SUMMARY

A powertrain system includes a multi-mode transmission configured to transfer torque among an engine, first and second torque machines, and an output member in one of a plurality of transmission ranges. A method for operating the powertrain system includes executing a transmission shift between an initial electrically-variable transmission (EVT) range and a target EVT range. The transmission shift includes transitioning to operating with three speed degrees of freedom including controlling speed of the second torque machine to synchronize speed of an oncoming clutch associated with the target EVT range and coincidentally controlling speeds of the first torque machine and the engine to achieve a preferred speed of the output member of the transmission. The transmission shift further includes controlling torque output from the first torque machine in response to an output torque request, and activating the oncoming clutch upon synchronizing the speed of the oncoming clutch. Subsequent to the transmission shift, the powertrain system is operated in the target EVT range.

BRIEF DESCRIPTION OF THE DRAWINGS

One or more embodiments will now be described, by way of example, with reference to the accompanying drawings, in which.

DETAILED DESCRIPTION

Figure 1:
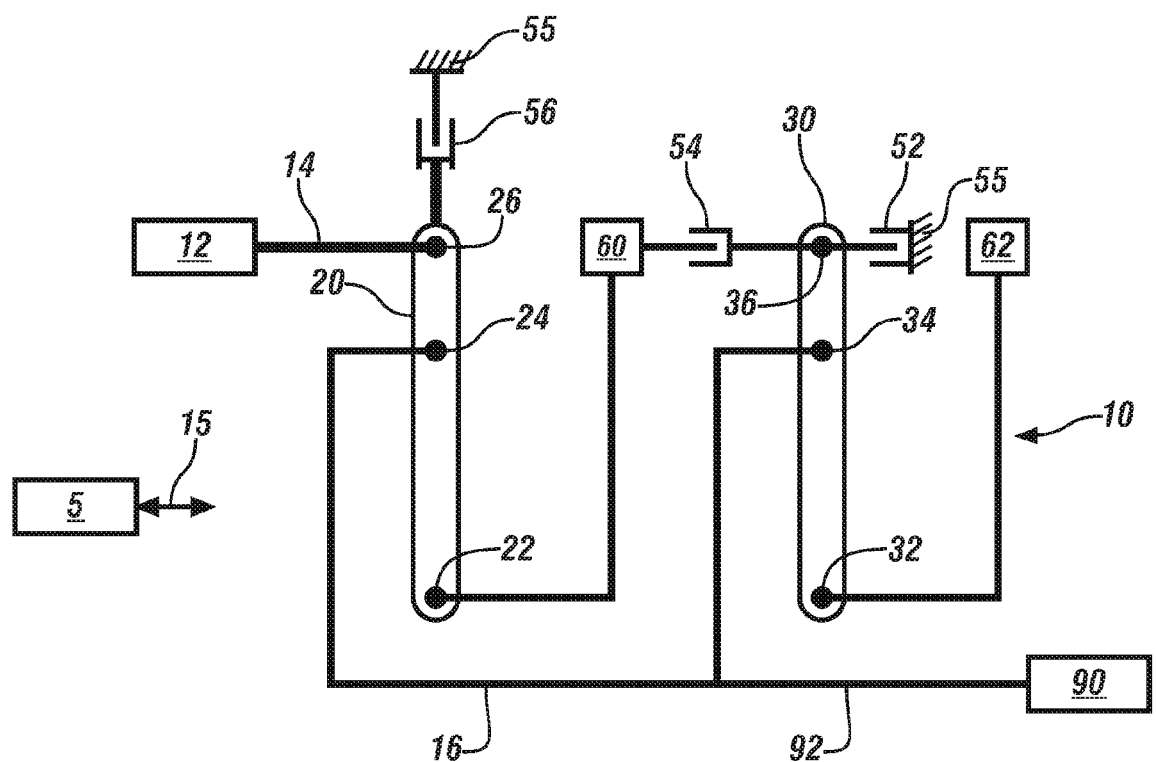
FIG. 1 illustrates a multi-mode powertrain system including an internal combustion engine, transmission, and a driveline, in accordance with the disclosure.

Referring now to the drawings, wherein the showings are for the purpose of illustrating certain exemplary embodiments only and not for the purpose of limiting the same, FIG. 1 depicts multi-mode powertrain system including an internal combustion engine (engine) 12, a multi-mode transmission (transmission) 10, a high-voltage electrical system, a driveline 90, and a controller 5. The transmission 10 mechanically couples to torque actuators including the engine 12 and first and second torque machines 60 and 62, respectively, and is configured to transfer torque between the engine 12, the first and second torque machines 60, 62, and the driveline 90. As illustrated, the first and second torque machines 60, 62 are electric motor/generators. The driveline 90 can include a differential system that facilitates a rear-wheel drive vehicle configuration or a transaxle system that facilitates a front-wheel drive vehicle configuration.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. Power output from the engine 12, i.e., engine speed and engine torque, can differ from input speed and input torque to the transmission 10 due to placement of torque-consuming components on the input member 14 between the engine 12 and the transmission 10, e.g., a torque management device or a mechanically-powered hydraulic pump. The engine 12 is configured to execute autostop and autostart operations during ongoing powertrain operation in response to operating conditions. The controller 5 is configured to control actuators of the engine 12 to control combustion parameters including intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60, 62.

The illustrated transmission 10 is a two-mode, compound-split, electro-mechanical transmission that includes two planetary-gear sets 20 and 30, and three engageable torque-transferring devices, i.e., clutches C1 52, C2 54, and C3 56. The two modes of operation refer to power-split modes of operation, including an input-split mode and a compound-split mode, as described herein. Other embodiments of the transmission are contemplated, including those have three or more power-split modes of operation. The transmission 10 is configured to transfer torque between the engine 12, the first and second torque machines 60, 62, and an output member 92 in response to an output torque request. The first and second torque machines 60, 62 are motor/generators that employ electric energy to generate and react torque in one embodiment. The planetary gear set 20 includes a sun gear member 22, a ring gear member 26, and planet gears 24 coupled to a carrier member. The carrier member rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member. The planet gears 34 are disposed in meshing relationship with both the sun gear member 32 and the ring gear member 36, and the carrier member couples to the rotatable shaft member 16.

As used herein, clutches refer to torque transfer devices that can be selectively applied in response to a control signal. Each of the clutches may be any suitable torque transfer device including by way of example a single or compound plate clutch or pack, a one-way clutch, a band clutch, or brake. In one embodiment, one or more of the clutches may include one-way clutch devices or selectable one-way clutch devices. A control circuit is configured to control clutch states of each of the clutches, including activating and deactivating each of the clutches. In one embodiment, the control circuit is a hydraulic circuit configured to control clutch states of each of the clutches, with pressurized hydraulic fluid supplied by a hydraulic pump that can be operatively controlled by the controller 5. Clutch C2 54 is a rotating clutch. Clutches C1 52 and C3 56 are brake devices that can be grounded to a transmission case 55.

A high-voltage electrical system includes an electrical energy storage device, e.g., a high-voltage battery (battery) electrically coupled to an inverter module via a high-voltage electrical bus, and is configured with suitable devices for monitoring electric power flow including devices and systems for monitoring electric current and voltage. The battery can be any suitable high-voltage electrical energy storage device, e.g., a high-voltage battery, and preferably includes a monitoring system that provides a measure of electrical power supplied to the high-voltage electrical bus, including voltage and electric current.

The first and second torque machines 60, 62 are three-phase AC motor/generator machines in one embodiment with each including a stator, a rotor, and a rotational speed sensor, e.g., a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches a rotating member that couples to the sun gear 22 of the first planetary gear set 20. The rotor for the second torque machine 62 is fixedly attached to a rotating member that couples to the sun gear 32 of the second planetary gear set 30.

The output member 92 of the transmission 10 is rotatably connected to the driveline 90 to provide output power to the driveline 90 that is transferred to one or a plurality of vehicle wheels via differential gearing, a transaxle, or another suitable device in this embodiment. The output power at the output member 92 is characterized in terms of an output rotational speed and an output torque.

The input torque from the engine 12 and the motor torques from the first and second torque machines 60, 62 are generated as a result of energy conversion from fuel or electrical potential stored in the battery. The battery is DC-coupled to the inverter module via the high-voltage electrical bus. The inverter module preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors (IGBTs) for converting DC power from the battery to AC power for powering respective ones of the first and second torque machines 60 and 62, by switching at high frequencies. The IGBTs form a switch mode power supply configured to receive control commands. Each phase of each of the three-phase electric machines includes a pair of IGBTs. States of the IGBTs are controlled to provide motor drive mechanical power generation or electric power regeneration functionality. The three-phase inverters receive or supply DC electric power via DC transfer conductors and transform it to or from three-phase AC power, which is conducted to or from the first and second torque machines 60 and 62 for operation as motors or generators via transfer conductors. The inverter module transfers electrical power to and from the first and second torque machines 60 and 62 through the power inverters and respective motor control modules in response to the motor torque commands. Electrical current is transmitted across the high-voltage electrical bus to and from the battery to charge and discharge the high-voltage battery.

The controller 5 signally and operatively links to various actuators and sensors in the powertrain system via a communications link 15 to monitor and control operation of the powertrain system, including synthesizing information and inputs, and executing algorithms to control actuators to meet control objectives related to fuel economy, emissions, performance, drivability, and protection of hardware, including cells of the high-voltage battery and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the inverter module. A user interface is preferably signally connected to a plurality of devices through which a vehicle operator directs and commands operation of the powertrain system, including commanding an output torque request and selecting a transmission range. The devices preferably include an accelerator pedal, an operator brake pedal, a transmission range selector (PRNDL), and a vehicle speed cruise control system. The transmission range selector may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The operator-selectable positions of the transmission range selector can correspond directly to individual transmission ranges described with reference to Table 1, or may correspond to subsets of the transmission ranges described with reference to Table 1. The user interface may include a single device, as shown, or alternatively may include a plurality of user interface devices directly connected to individual control modules.

The aforementioned control modules communicate with other control modules, sensors, and actuators via the communications link 15, which effects structured communication between the various control modules. The communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, and may include direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals referred to as loop cycles, for example each 3.125, 6.25, 12.5, 25 and 100 milliseconds during ongoing engine and vehicle operation. Alternatively, routines may be executed in response to occurrence of an event.

The multi-mode powertrain is configured to operate in one of a plurality of powertrain states, including a plurality of transmission ranges and engine states to generate and transfer torque to the driveline 90. The engine states include an ON state, an OFF state, and a fuel cutoff (FCO) state. When the engine operates in the OFF state, it is unfueled, not firing, and is not spinning. When the engine operates in the ON state it is fueled, firing, and spinning. When the engine operates in the FCO state, it is spinning but is unfueled and not firing. The engine ON state may further include an all-cylinder state (ALL) wherein all cylinders are fueled and firing, and a cylinder-deactivation state (DEAC) wherein a portion of the cylinders are fueled and firing and the remaining cylinders are unfueled and not firing. The transmission ranges include a plurality of neutral (Neutral), fixed gear (Gear #), electric vehicle (EV#), and electrically-variable mode (EVT Mode #) ranges that are achieved by selectively activating the clutches C1 52, C2 54, and C3 56. The Neutral range is also referred to as an electric torque converter (ETC) range, during which electric power can flow to or from the battery in relation to the output torque, the engine speed, the output speed, and speed of one of the torque machines. Other powertrain states, e.g., transitional ranges may be employed. Table 1 depicts a plurality of the powertrain states including transmission ranges and engine states for operating the multi-mode powertrain.

TABLE 1

| Range | Engine State | C1 | C2 | C3 |
|---|---|---|---|---|
| Neutral 1/ETC | ON(ALL/DEAC/FCO)/OFF | | | |
| EVT Mode 1 | ON(ALL/DEAC/FCO) | x | | |
| EVT Mode 2 | ON(ALL/DEAC/FCO) | | x | |
| Fixed Gear 1 | ON(ALL/DEAC/FCO) | x | x | |
| 2 Motor EV | OFF | x | | x |
| Motor A EV | OFF | | | x |
| Motor B EV | OFF | x | | |

The powertrain configuration permits two power split modes of operation when the engine is on, including an input-split mode, e.g., EVT1 and a compound-split mode, e.g., EVT2. The configurations allows the second torque machine 62 to be disconnected from the transmission output member 92 without disrupting the flow of power from the engine 12 and first torque machine 60. This configuration permits use of a shift strategy whereby transmission range changes may be accomplished by disconnecting the second torque machine 62 and controlling its speed independently of the engine 12 and the output member 92 to synchronize elements of an oncoming clutch.

When operating in Fixed Gear 1 range, the powertrain system has a single degree of freedom (1-dF) with regard to speed. Thus, there is a single independent speed node, and all other speed nodes are linearly dependent thereon. For example, all speed nodes including the input speed (Ni) are proportional to output speed (No). Exemplary governing equations include the following:

$$[To] = [A1 \quad A2 \quad A3] * \begin{bmatrix} Ta \\ Tb \\ Ti \end{bmatrix} \quad [1]$$

and $$\begin{bmatrix} Na \\ Nb \\ Ni \end{bmatrix} = [B1 \quad B2 \quad B3] * [No] \quad [2]$$

wherein
Ta represents torque output of the first torque machine 60,
Tb represent the torque output of the second torque machine 62,
Ti represents the input torque at member 14, i.e., from the engine 12,
To represents the output torque at member 92,
Na represents the speed of the first torque machine 60,
Nb represents the speed of the second torque machine 62,
Ni represents the input speed at member 14,
No represents the output speed at member 92, and
A1, A2, A3, B1, B2, and B3 are application-specific scalar values determined based upon gearing relationships.

When operating in one of the EV or EVT ranges, the powertrain system has two degrees of freedom (2-dF) with regard to speed, thus allowing two independent speed nodes. For example, all speed nodes other than the input and output speeds can be calculated as a linear combination of the input and output speeds. Exemplary governing equations include the following:

$$\begin{bmatrix} Ta \\ Tb \end{bmatrix} = \begin{bmatrix} A11 & A12 \\ A21 & A22 \end{bmatrix} * \begin{bmatrix} Ti \\ To \end{bmatrix} \quad [3]$$

and $$\begin{bmatrix} Na \\ Nb \end{bmatrix} = \begin{bmatrix} B11 & B12 \\ B21 & B22 \end{bmatrix} * \begin{bmatrix} Ni \\ No \end{bmatrix} \quad [4]$$

wherein A11, A12, A21, A22, B11, B12, B21, and B22 are application specific scalar values determined based upon gearing relationships.

When operating in the ETC range, the powertrain system has three degrees of freedom (3-dF) with regard to speed including the input speed, output speed and one other speed. In this range, there may not be the flexibility to choose motor torques such that battery power is zero for any given engine torque. When no clutches are applied, the transmission is in the ETC range. In this transmission range, the second torque machine 62 is decoupled from the transmission, so its speed may be independently controlled. The torque output Ta of the first torque machine 60 is proportional to the output torque To, and its speed is a linear combination of input and output speed. Exemplary governing equations include the following:

$$\begin{bmatrix} Ti \\ Ta \\ Tb \end{bmatrix} = [A1 \quad A2 \quad A3][To] \quad [5]$$

and $$[No] = [B1 \quad B2 \quad B3] * \begin{bmatrix} Ni \\ Na \\ Nb \end{bmatrix} \quad [6]$$

wherein A1, A2, A3, B1, B2, and B3 are application-specific scalar values determined based upon gearing relationships.

A control scheme is employed to effect a change to a final transmission range and powertrain state that includes operating the powertrain system in the ETC range to take advantage of the three degrees of freedom with regard to speed. Employing the ETC range during a shift permits a transition between two of the EVT ranges while maintaining a constant engine speed in order to provide a vehicle feel that is perceived by the vehicle operator as smooth.

Figure 2:
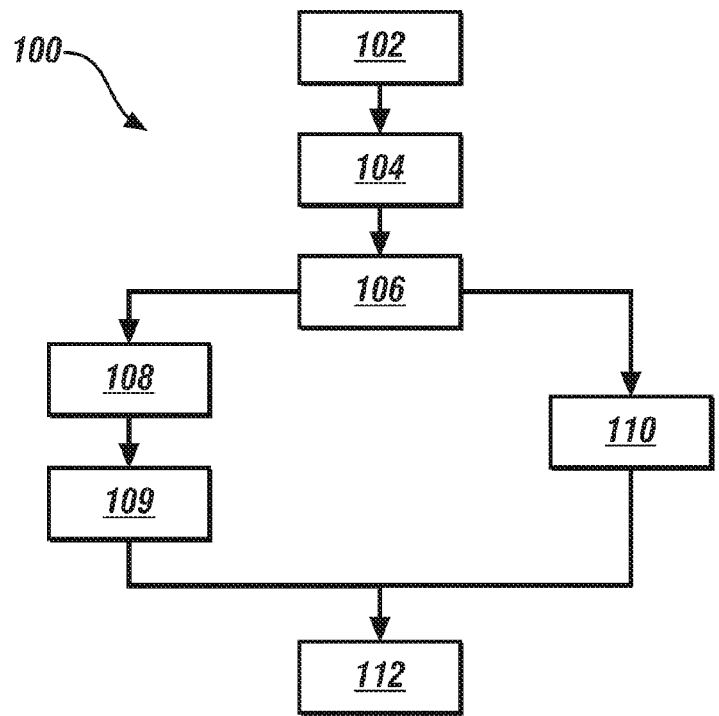
FIG. 2 illustrates a control scheme for effecting a change to a target transmission range that includes employing a transmission operating range having three degrees of freedom, in accordance with the disclosure.

FIG. 2 illustrates a control scheme 100 for effecting a change from an initial transmission range to a target transmission range that includes employing a transmission operating range having three degrees of freedom, referred to herein as a 3-dF shift. In the powertrain system described with reference to FIG. 1, the transmission operating range having three degrees of freedom includes the ETC range. The control scheme 100 can be executed in the controller 5 to control operation of an embodiment of the powertrain system described with reference to FIG. 1. Table 2 is provided as a key to FIG. 2 wherein the numerically labeled blocks and the corresponding functions are set forth as follows.

TABLE 2

| BLOCK | BLOCK CONTENTS |
|---|---|
| 102 | Command operation in target transmission range |
| 104 | Release OG clutch(es) |
| 106 | Operate transmission in 3-dF operating mode |
| 108 | Control speed of one of the torque actuators to synchronize OC clutch |
| 109 | Activate OC clutch when synchronized |
| 110 | Control speeds of remaining torque actuators to maintain a preferred output speed and control torque output of at least one of the remaining torque actuators to generate output torque responsive to output torque request |
| 112 | Operate transmission in target transmission range responsive to output torque request |

The 3-dF shift achieved by the control scheme 100 operates as follows. Initially, the powertrain system is preferably operating with the transmission in one of the EVT modes, e.g., one of EVT1 and EVT2 for the powertrain system described with reference to FIGS. 1 and 2, and Table 1. The powertrain system may have transitioned to operating with the transmission in one of the EVT modes immediately prior to executing the control scheme 100, including operating in one of the EV modes and executing an engine autostart operation immediately prior to executing the control scheme 100. In response to a command to operate in a target transmission range (102), off-going (OG) clutch(es) associated with a present operating range are released or otherwise deactivated (104), permitting operation of the transmission in an operating mode having three speed degrees of freedom (3-dF) (106). Operating the powertrain system with the transmission in an operating mode having 3-dF includes operating the transmission in the ETC range described in Table 1, thus permitting independent simultaneous speed control of the torque actuators of the powertrain system, i.e., the engine 12 and the first and second torque machines 60, 62. This includes controlling output of one of the torque actuators, e.g., the second torque machine 62 to synchronize speeds of elements of an oncoming (OC) clutch associated with the target transmission range (108). The oncoming clutch can be activated when its elements are synchronized (109). Simultaneously, speeds of the remaining torque actuators, e.g., the engine 12 and the first torque machine 60 are controlled to maintain a preferred output speed and torque output of at least one of the remaining torque actuators, e.g., the first torque machine is controlled to generate an output torque that is responsive to the output torque request (110). When the oncoming clutch is activated, operation of the powertrain system can be controlled in the target transmission range responsive to the output torque request (112). The powertrain system may then transition to operating with the transmission in one of the EV modes immediately after executing the 3-dF shift achieved by the control scheme 100, including executing an engine autostop operation.

The 3-dF shift achieved by the control scheme 100 can effect a shift from EVT1 to EVT2 without changing engine speed, e.g., without an engine flare during an autostart operation. This includes autostarting the engine when the vehicle is operating at medium speed, e.g., 80 km/h (50 mph). The initial transmission range is EV1 with clutch C1 activated and the engine operating at zero speed. The engine is started and controlled to operate at 1400 rpm. The first torque machine operates at positive speed. The propulsion torque is transitioned to be provided by the engine and first torque machine, with torque output from the second torque machine at zero. In this transmission range the maximum output torque is similar to the capability in EVT2. Clutch C1 is deactivated and speed of the second torque machine is decreased to synchronize speed of clutch C2, at which time clutch C2 can be engaged. Torque management can be adjusted from being provided exclusively by the first torque machine to a compound torque split with torque output provided by both the first and second torque machines. Once started, the engine can continue to operate at 1400 rpm during the entire shift to avoid engine flares that can occur during a synchronous transition.

The 3-dF shift achieved by the control scheme 100 can be executed to effect an upshift from EVT1 to EVT2 with the second torque machine operating at a zero torque point. The initial transmission range is EVT1 with clutch C1 activated. The vehicle accelerating in EVT1 with the engine operating at power peak (in one example at an operating point of 5500 rpm and 150 Nm), the first torque machine generating electric power and the second torque machine consuming electric power. At low vehicle speeds, the speed of first torque machine is negative. As the vehicle accelerates with the engine speed held at a constant speed, the speed of the first torque machine decreases to zero. The vehicle continues to accelerate until the first torque machine consumes all available battery power and torque output of the second torque machine is zero. At this point, clutch C1 is deactivated and speed of the second torque machine is decreased to synchronize speed of clutch C2, at which time clutch C2 can be engaged. Torque management can be adjusted from being provided exclusively by the first torque machine to a compound torque split with torque output provided by both the first and second torque machines.

The 3-dF shift achieved by the control scheme 100 can reduce time to execute a shift as compared to a shift execution scheme that operates with two degrees of freedom to execute a shift. There is also a reduction in disruption of output torque during a 3-dF shift. The 3-dF shift achieved by the control scheme 100 eliminates a requirement for energy-dissipating clutches, allowing use of other clutch technologies. Such operation also permits transitions between the EVT ranges while maintaining constant engine speed. Execution of the 3-dF shift permits engine on-off transitions to occur at higher vehicle speeds, increasing fuel economy and EV drive capability. Execution of the 3-dF shift permits an increase in top speed of the second torque machine, which can be traded for a reduction in maximum torque requirements for the first torque machine, thus permitting a reduction in the physical size and cost of the first torque machine. Such operation precludes a need to execute a transition from an input-split range to a compound-split range at a synchronous operating point, thus precluding a need to execute a transmission shift at a synchronous operating point. Such operation also means shift execution of the 3-dF shift is less perceptible to the operator. The 3-dF shift achieved by the control scheme 100 can be executed as part of an overall scheme to execute a shift from a first EVT range to a second EVT range and immediately subsequently transitioning to an EV range. The 3-dF shift achieved by the control scheme 100 can be executed as part of an overall scheme to execute a shift from an EV range to a first EVT range and immediately subsequently transitioning to a second EVT range.

Figure 3:
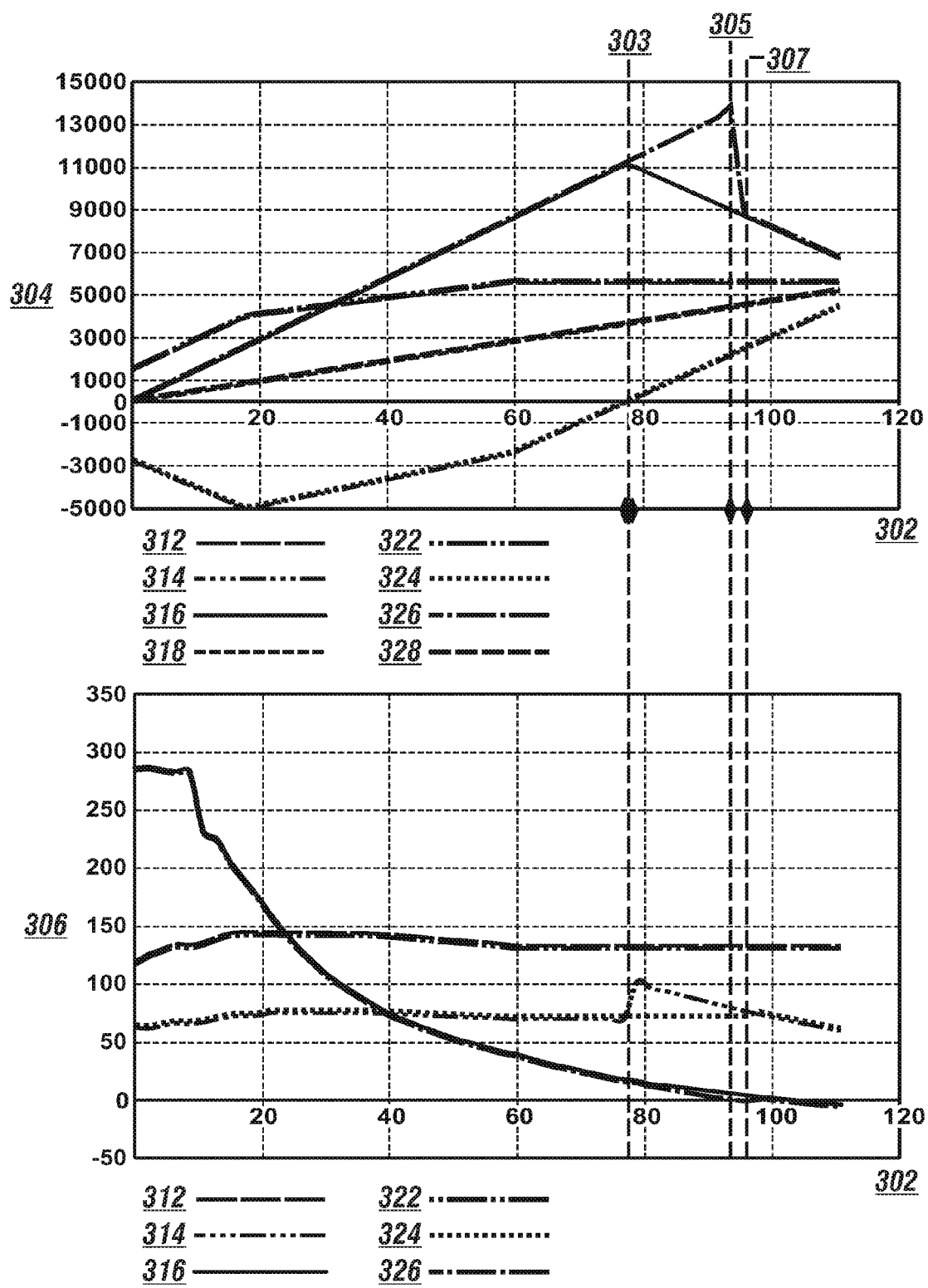
FIG. 3 illustrates operating parameters associated with the powertrain system of FIG. 1 executing the control scheme of FIG. 2, in accordance with the disclosure.

FIG. 3 graphically shows operating parameters associated with an embodiment of the powertrain system described with reference to FIG. 1 that includes executing a 3-dF shift. An embodiment of the 3-dF shift is described with reference to the control scheme 100 of FIG. 2. Operating data includes data associated with executing the 3-dF shift to effect an upshift from EVT1 to EVT2 compared with data associated with executing a synchronous shift from EVT1 to EVT2. The top portion of FIG. 3 shows device speed (RPM) on the vertical axis 304 in relation to vehicle speed (km/hr) on the horizontal axis 302, and a time-corresponding bottom portion shows torque output (Nm) on the vertical axis 306 in relation to the vehicle speed (km/hr) on the horizontal axis 302.

A plurality of speeds and torques associated with execution of a synchronous shift are shown, including engine speed 312, first torque machine speed 314, second torque machine speed 316, output member speed 318, engine torque 332, first torque machine torque 334, and second torque machine torque 336. The synchronous shift from EVT Mode 1 to EVT Mode 2 is depicted as being executed at time point 303, when the first torque machine speed 314 is zero, thus permitting simultaneous deactivation of clutch C1 and activation of clutch C2. In response to execution of the synchronous shift, the second torque machine speed 316 decreases, but there is a substantial bump up in the first torque machine torque 334 that is required to effect the shift while maintaining the output member speed 318 at a constant level. As shown, the first torque machine torque 334 increases torque output from 70 Nm to over 100 Nm to effect this change. Thus, the first torque machine must be designed to be capable of achieving this torque output in a system employing only synchronous shifts, whereas no such requirement exists for a powertrain system employing a multi-mode transmission including an embodiment of a control scheme 100 for effecting a change from an initial transmission range to a target transmission range that is configured to execute 3-dF shifts.

A plurality of speeds and torques associated with execution of a 3-dF shift are shown, including engine speed 322, first torque machine speed 324, second torque machine speed 326, output member speed 328, engine torque 342, first torque machine torque 344, and second torque machine torque 346. The 3-dF shift is depicted as beginning at time point 305 when clutch C1 is deactivated and ending at time point 307 when clutch C2 is activated. At time point 305, the second torque machine speed 326 is able to decrease substantially without affecting the first torque machine torque 344 or the second torque machine torque 346 to maintain the output member speed 328 at a constant level so as to minimize driveline disturbances associated with shift execution. Thus, an embodiment of a powertrain system employing a multi-mode transmission that is configured to execute 3-dF shifts may be designed to have a first torque machine 60 with a reduced maximum torque capacity and a second torque machine 62 with an increased maximum speed, as compared with an embodiment of the powertrain system that executes synchronous shifts.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclo-

The invention claimed is:

1. A method for operating a powertrain system including a multi-mode transmission configured to transfer torque among an engine, first and second torque machines, and an output member in one of a plurality of transmission ranges, the method comprising:
executing a transmission shift between an initial electrically-variable transmission (EVT) range and a target EVT range, comprising:
transitioning to operating with three speed degrees of freedom including controlling speed of the second torque machine to synchronize speed of an oncoming clutch associated with the target EVT range and coincidentally controlling speeds of the first torque machine and the engine to achieve a preferred speed of the output member of the transmission,
controlling torque output from the first torque machine in response to an output torque request, and
activating the oncoming clutch upon synchronizing the speed of the oncoming clutch; and then
operating the powertrain system in the target EVT range.

2. The method of claim 1, further comprising transitioning the powertrain system to operate in an electric vehicle (EV) range in response to the output torque request subsequent to operating the powertrain system in the target EVT range.

3. The method of claim 2, wherein transitioning the powertrain system to operate in the EV range comprises executing an engine autostop maneuver.

4. The method of claim 1, wherein transitioning to operating with three speed degrees of freedom comprises deactivating an off-going clutch in the multi-mode transmission.

5. The method of claim 1, further comprising operating the powertrain system in an electric vehicle (EV) range immediately prior to executing the transmission shift between the initial EVT range and the target EVT range.

6. A method for controlling a multi-mode transmission in response to a command to execute a shift between a first electrically-variable transmission (EVT) range and a second EVT range, comprising:
transitioning the multi-mode transmission to operating with three speed degrees of freedom;
controlling torque output from a first torque machine coupled to the transmission in response to an output torque request;
controlling speed of a second torque machine coupled to the transmission to synchronize speed of an oncoming clutch associated with the second EVT range and coincidentally controlling speed of the first torque machine and controlling speed of an engine coupled to the transmission to achieve a preferred speed of an output member of the transmission;
activating the oncoming clutch upon synchronizing the speed of the oncoming clutch; and then
operating the transmission in the second EVT range responsive to the output torque request.

7. The method of claim 6, further comprising transitioning the multi-mode transmission to operate in an electric vehicle (EV) range in response to the output torque request subsequent to operating in the second EVT range.

8. The method of claim 7, wherein transitioning the multi-mode transmission to operate in the EV range comprises executing an engine autostop operation.

9. The method of claim 6, wherein transitioning the multi-mode transmission to operating with three speed degrees of freedom comprises deactivating a clutch in the multi-mode transmission.

10. The method of claim 6, further comprising operating the multi-mode transmission in an electric vehicle (EV) range immediately prior to executing the transmission shift between the first EVT range and the second EVT range.

11. A method for operating a powertrain system including a multi-mode transmission configured to transfer torque among first, second, and third independently controlled torque actuators and an output member, comprising:
transitioning the multi-mode transmission to operate with three speed degrees of freedom;
controlling speed of one of the torque actuators to synchronize speed of an oncoming clutch associated with a target transmission range and coincidentally controlling speeds of the two other torque actuators to achieve a preferred speed of the output member of the transmission, controlling torque output from said one of the torque actuators in response to an output torque request, and activating the oncoming clutch upon synchronizing the speed of the oncoming clutch; and then
operating the multi-mode transmission in the target transmission range and controlling the first, second, and third independently controlled torque actuators in response to the output torque request.

12. The method of claim 11, wherein the first, second, and third independently controlled torque actuators comprise an internal combustion engine and first and second electric motor/generators.

* * * * *